United States Patent
Milyakov et al.

(10) Patent No.: US 10,447,623 B2
(45) Date of Patent: Oct. 15, 2019

(54) DATA STORAGE SYSTEMS AND METHODS USING A REAL-TIME MESSAGING SYSTEM

(71) Applicant: Machine Zone, Inc., Palo Alto, CA (US)

(72) Inventors: Igor Milyakov, Sunnyvale, CA (US); Fredrik E. Linder, Dublin, CA (US); Anton Koinov, Santa Clara, CA (US); Francois Orsini, San Francisco, CA (US); Boaz Sedan, Palo Alto, CA (US); Oleg Khabinov, Sunnyvale, CA (US); Bartlomiej Puzon, Burlingame, CA (US)

(73) Assignee: Satori Worldwide, LLC, Palo Alto, CA (US)

(*) Notice: Subject to any disclaimer, the term of this patent is extended or adjusted under 35 U.S.C. 154(b) by 0 days.

(21) Appl. No.: 15/442,286

(22) Filed: Feb. 24, 2017

(65) Prior Publication Data
US 2018/0248820 A1    Aug. 30, 2018

(51) Int. Cl.
| | |
|---|---|
| G06F 15/16 | (2006.01) |
| H04L 12/58 | (2006.01) |
| H04L 29/08 | (2006.01) |
| G06F 16/2458 | (2019.01) |
| G06F 16/23 | (2019.01) |

(52) U.S. Cl.
CPC .......... *H04L 51/04* (2013.01); *G06F 16/23* (2019.01); *G06F 16/2474* (2019.01); *H04L 51/14* (2013.01); *H04L 67/146* (2013.01); *H04L 67/26* (2013.01)

(58) Field of Classification Search
CPC .............................. H04L 51/04; H04L 67/146
USPC .......................................................... 709/206
See application file for complete search history.

(56) References Cited

U.S. PATENT DOCUMENTS

| | | | |
|---|---|---|---|
| 4,264,924 A | 4/1981 | Freeman | |
| 5,404,488 A * | 4/1995 | Kerrigan | ............... G06F 16/252 711/133 |
| 5,706,331 A | 1/1998 | Wang et al. | |
| 5,878,228 A | 3/1999 | Miller et al. | |
| 6,208,691 B1 | 3/2001 | Balakrishnan et al. | |

(Continued)

FOREIGN PATENT DOCUMENTS

WO    2016118979 A2    7/2016

OTHER PUBLICATIONS

Ireland. "Discussion Forums with PHP". 2008. pp. 1-8.*

(Continued)

*Primary Examiner* — Imad Hussain
(74) *Attorney, Agent, or Firm* — Womble Bond Dickinson (US) LLP; Daniel E. Ovanezian

(57) ABSTRACT

Methods, systems, and apparatus, including computer programs encoded on a computer storage medium, for implementing key-value store functionality within a real-time messaging system. An example method includes: providing a plurality of channels, wherein each channel comprises an ordered plurality of messages, wherein each channel represents a unique key, and wherein each message comprises one or more key-value pairs; receiving a function comprising a key for identifying one of the plurality of channels and processing instructions to be applied to a subset of the key-value pairs; and applying the processing instructions based at least in part on the unique key.

20 Claims, 13 Drawing Sheets

(56) References Cited

U.S. PATENT DOCUMENTS

| | | | |
|---|---|---|---|
| 6,549,959 B1 | 4/2003 | Yates et al. | |
| 7,047,394 B1 | 5/2006 | Van Dyke et al. | |
| 7,065,633 B1 | 6/2006 | Yates, Jr. et al. | |
| 7,376,092 B2 | 5/2008 | Yajnik et al. | |
| 7,613,813 B2 | 11/2009 | Hussain et al. | |
| 7,668,908 B2 | 2/2010 | Kakivaya et al. | |
| 7,676,580 B2 | 3/2010 | Hill et al. | |
| 7,747,705 B1* | 6/2010 | Raja | G06Q 10/107 709/201 |
| 7,774,720 B1 | 8/2010 | Demetriades et al. | |
| 7,917,124 B2 | 3/2011 | D'Angelo et al. | |
| 7,929,562 B2 | 4/2011 | Petrovykh | |
| 7,930,349 B2 | 4/2011 | Hussain et al. | |
| 7,941,448 B2 | 5/2011 | Eslambolchi et al. | |
| 7,970,828 B2 | 6/2011 | Carmeli et al. | |
| 7,970,918 B2 | 6/2011 | Thompson et al. | |
| 8,051,140 B2 | 11/2011 | Lum et al. | |
| 8,065,384 B2 | 11/2011 | Plewnia et al. | |
| 8,065,504 B2 | 11/2011 | Yates, Jr. et al. | |
| 8,074,055 B1 | 12/2011 | Yates, Jr. et al. | |
| 8,086,672 B2 | 12/2011 | Horvitz | |
| 8,121,828 B2 | 2/2012 | Yates, Jr. et al. | |
| 8,352,425 B2* | 1/2013 | Bourbonnais | G06F 16/23 707/615 |
| 8,375,095 B2 | 2/2013 | Yurkovich et al. | |
| 8,392,555 B2 | 3/2013 | Gale et al. | |
| 8,429,702 B2 | 4/2013 | Yasrebi et al. | |
| 8,441,965 B2 | 5/2013 | Jazra | |
| 8,489,674 B2 | 7/2013 | Srivastava et al. | |
| 8,539,359 B2 | 9/2013 | Rapaport et al. | |
| 8,605,781 B2 | 12/2013 | Rabenold et al. | |
| 8,799,213 B2 | 8/2014 | Wong et al. | |
| 8,850,015 B2 | 9/2014 | Finn | |
| 8,850,490 B1 | 9/2014 | Thomas et al. | |
| 8,856,202 B2 | 10/2014 | McCabe et al. | |
| 8,867,710 B2* | 10/2014 | Chau | H04L 51/14 379/88.12 |
| 8,886,731 B2 | 11/2014 | Gunawardena et al. | |
| 8,898,293 B2 | 11/2014 | Raleigh et al. | |
| 8,965,409 B2 | 2/2015 | Abhyanker | |
| 9,043,822 B1 | 5/2015 | Calzone et al. | |
| 9,215,261 B2 | 12/2015 | Marcus | |
| 9,270,944 B2 | 2/2016 | Brooks et al. | |
| 9,319,363 B1* | 4/2016 | Walkin | H04L 67/26 |
| 9,385,976 B1 | 7/2016 | Hafri | |
| 9,397,973 B1 | 7/2016 | Kushnir et al. | |
| 9,407,585 B1 | 8/2016 | Walkin et al. | |
| 9,450,944 B1* | 9/2016 | Sousley | H04L 67/02 |
| 9,509,684 B1* | 11/2016 | Dixson-Boles | H04L 63/083 |
| 9,602,450 B1* | 3/2017 | Kushnir | H04L 51/16 |
| 9,706,055 B1* | 7/2017 | Alothman | H04M 3/53 |
| 2002/0016851 A1 | 2/2002 | Border | |
| 2003/0145281 A1* | 7/2003 | Thames | G06F 8/71 715/205 |
| 2003/0188196 A1* | 10/2003 | Choi | H04L 51/12 726/24 |
| 2004/0073641 A1 | 4/2004 | Minhazuddin et al. | |
| 2004/0083264 A1 | 4/2004 | Veselov | |
| 2004/0139166 A1 | 7/2004 | Collison | |
| 2004/0139309 A1 | 7/2004 | Gentil et al. | |
| 2004/0167932 A1 | 8/2004 | Edmonds | |
| 2005/0021622 A1 | 1/2005 | Cullen | |
| 2005/0047396 A1 | 3/2005 | Helm et al. | |
| 2005/0171799 A1 | 8/2005 | Hull et al. | |
| 2005/0193041 A1* | 9/2005 | Bourbonnais | G06F 16/23 |
| 2005/0262205 A1 | 11/2005 | Nikolov et al. | |
| 2005/0262215 A1 | 11/2005 | Kirov et al. | |
| 2006/0036679 A1 | 2/2006 | Goodman et al. | |
| 2006/0064464 A1* | 3/2006 | Kakivaya | H04L 1/1848 709/206 |
| 2006/0075119 A1 | 4/2006 | Hussain et al. | |
| 2006/0106840 A1 | 5/2006 | Rooney | |
| 2006/0149787 A1 | 7/2006 | Surlaker et al. | |
| 2006/0168070 A1* | 7/2006 | Thompson | G06F 9/542 709/206 |
| 2007/0013948 A1 | 1/2007 | Bevan | |
| 2007/0028173 A1 | 2/2007 | Lauder | |
| 2007/0038712 A1* | 2/2007 | Affronti | G06Q 10/06 709/206 |
| 2007/0198534 A1* | 8/2007 | Hon | G06F 16/44 |
| 2008/0005234 A1* | 1/2008 | Newnam Giardino | G06Q 10/10 709/204 |
| 2008/0016198 A1 | 1/2008 | Johnston-Watt et al. | |
| 2008/0091812 A1* | 4/2008 | Lev-Ran | H04L 29/12169 709/223 |
| 2008/0186973 A1 | 8/2008 | Shihara et al. | |
| 2008/0235366 A1 | 9/2008 | Telfer et al. | |
| 2008/0320090 A1* | 12/2008 | Bryan | G06Q 10/00 709/206 |
| 2009/0037514 A1 | 2/2009 | Lankford et al. | |
| 2009/0157795 A1 | 6/2009 | Black | |
| 2009/0222348 A1 | 9/2009 | Ransom et al. | |
| 2009/0287761 A1 | 11/2009 | Hawkins et al. | |
| 2009/0327323 A1* | 12/2009 | Altinel | G06F 16/972 |
| 2010/0023626 A1 | 1/2010 | Hussain et al. | |
| 2010/0251262 A1 | 9/2010 | Rokicki et al. | |
| 2011/0060812 A1 | 3/2011 | Middleton | |
| 2011/0176554 A1 | 7/2011 | Yamada et al. | |
| 2011/0179020 A1* | 7/2011 | Ozzie | G06F 16/958 707/723 |
| 2011/0179162 A1 | 7/2011 | Mayo et al. | |
| 2011/0225229 A1 | 9/2011 | Srivastava et al. | |
| 2011/0231523 A1 | 9/2011 | Haugland et al. | |
| 2011/0246503 A1* | 10/2011 | Bender | G06F 9/546 707/769 |
| 2012/0023116 A1 | 1/2012 | Wilkes et al. | |
| 2012/0096546 A1* | 4/2012 | Dilley | H04L 67/2804 726/22 |
| 2012/0150960 A1 | 6/2012 | Nalawade | |
| 2012/0197990 A1 | 8/2012 | Li et al. | |
| 2012/0254175 A1* | 10/2012 | Horowitz | G06F 16/278 707/737 |
| 2012/0278728 A1 | 11/2012 | Malin et al. | |
| 2012/0284756 A1 | 11/2012 | Kotecha et al. | |
| 2012/0296939 A1* | 11/2012 | Beaver | G06F 9/542 707/791 |
| 2013/0024526 A1* | 1/2013 | Sacks | G06Q 10/10 709/206 |
| 2013/0031162 A1 | 1/2013 | Willis et al. | |
| 2013/0066967 A1 | 3/2013 | Alexander | |
| 2013/0067114 A1 | 3/2013 | Hjelm et al. | |
| 2013/0081060 A1 | 3/2013 | Otenko | |
| 2013/0130657 A1* | 5/2013 | Park | H04W 4/12 455/412.1 |
| 2013/0132553 A1 | 5/2013 | Stratton et al. | |
| 2013/0159472 A1 | 6/2013 | Newton et al. | |
| 2013/0212491 A1 | 8/2013 | Yerli | |
| 2013/0254314 A1 | 9/2013 | Chow | |
| 2013/0290249 A1* | 10/2013 | Merriman | G06F 16/273 707/610 |
| 2013/0290449 A1 | 10/2013 | Norby et al. | |
| 2013/0340097 A1 | 12/2013 | Gowel | |
| 2014/0006973 A1* | 1/2014 | Cattermole | H04L 65/40 715/753 |
| 2014/0082085 A1 | 3/2014 | Krishnaprasad et al. | |
| 2014/0114738 A1 | 4/2014 | Tseng et al. | |
| 2014/0149452 A1* | 5/2014 | Nguyen | H04L 51/00 707/769 |
| 2014/0156618 A1* | 6/2014 | Castellano | G06F 16/2358 707/703 |
| 2014/0189772 A1 | 7/2014 | Yamagishi et al. | |
| 2014/0226713 A1 | 8/2014 | Perlman et al. | |
| 2014/0237057 A1 | 8/2014 | Khodorenko | |
| 2014/0279944 A1* | 9/2014 | Ghandeharizadeh | G06F 16/2365 707/690 |
| 2014/0286354 A1 | 9/2014 | Van De Poel et al. | |
| 2014/0310369 A1 | 10/2014 | Makhervaks et al. | |

(56) References Cited

U.S. PATENT DOCUMENTS

| | | | | |
|---|---|---|---|---|
| 2014/0337361 | A1* | 11/2014 | Gailis | G06F 16/9535 |
| | | | | 707/752 |
| 2014/0351719 | A1* | 11/2014 | Cattermole | H04L 65/403 |
| | | | | 715/753 |
| 2014/0372489 | A1 | 12/2014 | Jaiswal et al. | |
| 2014/0372755 | A1 | 12/2014 | Ristock et al. | |
| 2015/0012598 | A1 | 1/2015 | Klimt et al. | |
| 2015/0100664 | A1 | 4/2015 | Flack et al. | |
| 2015/0120854 | A1* | 4/2015 | Bhat | H04L 51/26 |
| | | | | 709/207 |
| 2015/0207851 | A1 | 7/2015 | Nampally et al. | |
| 2015/0262151 | A1 | 9/2015 | Enzminger et al. | |
| 2015/0317676 | A1 | 11/2015 | Reid et al. | |
| 2015/0365358 | A1 | 12/2015 | Strassner | |
| 2015/0379160 | A1 | 12/2015 | Avraham et al. | |
| 2016/0041894 | A1* | 2/2016 | Reid | G06F 11/3636 |
| | | | | 714/45 |
| 2016/0072865 | A1 | 3/2016 | Kaplinger et al. | |
| 2016/0127465 | A1* | 5/2016 | Barstow | G06F 16/27 |
| | | | | 707/620 |
| 2016/0179855 | A1* | 6/2016 | Roman | H04L 63/08 |
| | | | | 707/744 |
| 2016/0219089 | A1 | 7/2016 | Murthy et al. | |
| 2016/0261480 | A1 | 9/2016 | Agarwal et al. | |
| 2016/0285986 | A1 | 9/2016 | Mokhtari et al. | |
| 2016/0335293 | A1* | 11/2016 | Teodorescu | G06F 16/9024 |
| 2017/0006135 | A1* | 1/2017 | Siebel | H04L 67/02 |
| 2017/0039242 | A1* | 2/2017 | Milton | G06Q 30/0269 |
| 2017/0041266 | A1* | 2/2017 | Walkin | H04L 51/14 |
| 2017/0041417 | A1* | 2/2017 | Walkin | H04L 51/04 |
| 2017/0111336 | A1* | 4/2017 | Davis | H04L 63/08 |
| 2017/0331771 | A1* | 11/2017 | Kushnir | H04L 51/16 |

OTHER PUBLICATIONS

Savage. "How to version control data stored in mysql". 2010. pp. 1-2.*

Mitchell et al. "PhpBB 3.0—Forum Pruning". Aug. 9, 2014. pp. 1-7. (Year: 2014).*

"Cloud Pub/Sub," accessed on the Internet at: https://cloud.google.com/pubsub/overview; ; downloaded Aug. 7, 2015; 5pgs;.

"Publish-subscribe pattern"; accessed on the Internet at: https://en.wikipedia.org/wiki/Publish%E2%80%93subscribe_pattern; downloaded Aug. 7, 2015; 4pgs.

"Welcome to PyPubSub's Home Page!," accessed on the internet at: http://pubsub.sourceforge.net/; downloaded Aug. 7, 2015; 2pgs.

Bustamante, F., "The Active Streams Approach to Adaptive Distributed Applications and Services," Thesis, Georgia Institute of Technology; 112pgs.; Nov. 2001.

Cagle, K., "Convert a Text File to XML," accessed on the internet at http://www.devx.com/getHelpOn/10MinuteSolution/20356; downloaded Sep. 22, 2016; 8pgs.

Chakravarthy, S. and Vontella, N., "A Publish / Subscribe Based Architecture of an Alert Server to Support Prioritized and Persistent Alerts," Lecture Notes in Computer Science; 3347:1-6-116; Jan. 2004.

Cilia, M., et al., "Looking into the Past: Enhancing Mobile Publish/Subscribe Middleware," Proceedings of the 2nd Int'l Workshop on Distributed Event-based Systems (DEBS '03); pp. 1-8; Jun. 2003.

Corsaro, A., et al., "Quality of Service in Publish/Subscribe Middleware," IOS Press; pp. 1-19; 2003.

Int'l Search Report and Written Opinion of the ISA/EP in PCT/US2014/041531; dated Oct. 6, 2016; 12 pgs.

Int'l Search Report and Written Opinion of the ISA/EP in PCT/US2016/022316; dated Jun. 1, 2016; 11pgs.

Int'l Search Report and Written Opinion of the ISA/EP in PCT/US2016/023164; dated Jul. 11, 2016; 15pgs.

Int'l Search Report and Written Opinion of the ISA/EP in PCT/US2016/037358; Oct. 10, 2016; 13pgs.

Int'l Search Report and Written Opinion of the ISA/EP in PCT/US2016/039958; dated Oct. 4, 2016; 11pgs.

Int'l Search Report and Written Opinion of the ISA/EP in PCT/US2016/041530; dated Oct. 6, 2016; 12pgs.

Jafarpour et al., "Dynamic Load Balancing for Cluster-based Publish/Subscribe System," IEEE 2009; http://ieeexplore.ieee.org/document/5230660/.

King, A., et al., "Load Balancing Content-Based Publish/Subscribe Systems," ACM Transactions on Computer Systems; 28(4):9:1-9:55; Dec. 2010.

Phanishayee, A., "Chaining for Flexible and High-Performance Key-Value Systems," Doctoral Dissertation, Carnegie Mellon University, School of Computer Science; 148pgs.; Sep. 2012.

Preshing, "Atomic vs. Non-Atomic Operations," accessed on the internet at http://preshing.com/20130618/atomic-vs-non-atomic-operations; downloaded Sep. 20, 2016; 10pgs.

Vahdat, A. and Becker, D., "Epidemic Routing for Partially-Connected Ad Hoc Networks," Duke University; 14pgs.; Jul. 2000.

Zeidler, et al., "Mobility Support with REBECA," Proc. 23rd Int'l Conference on Distributed Computing Systems Workshops; May 19-22, 2003; 7pgs.

Int'l Search Report and Written Opinion of the ISA/EP in PCT/US2018/019261 dated May 3, 2018; 13 pgs.

* cited by examiner

FIG. 4B

DATA STORAGE SYSTEMS AND METHODS USING A REAL-TIME MESSAGING SYSTEM

BACKGROUND

This specification relates to a data communication system and, in particular, a system for storing, retrieving and updating data processed using a channel-based real-time messaging system.

The publish-subscribe pattern (or "PubSub") is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Separately, various methods exist for storing data in different formats and using different technical processing techniques to store, retrieve and update data. One such method is a key-value store. While key-value stores may work well for certain data processing implementations, they lack various features that allow their use in others.

SUMMARY

Implementations of the subject matter described herein involve using a messaging system in which publishers provide messages into channels and subscribers subscribe to one or more channels to receive the messages. In addition, each of the channels may be identified using a unique key, and the messages associated with each channel/key are stored and processed as a key-value pairing within each channel. By modifying a real-time messaging system to operate as a key-value store, applications that subscribe to one or more channels provided by a real-time messaging system can access more than just a current value for each key. Each channel defined within a multi-channel messaging system is identified using a unique key, and the ordered set of messages that are published to and read from each channel can be referred to as a key-value pairing, with the body of the message providing the value associated with the key at a particular time. Moreover, subscribers to the channel(s) may provide processing functions to be applied against a subset of the key-values within messages assigned to a channel based on a channel/key mapping. The function may be received, stored and processed at a first processing node, or, in some cases the function may be sent on to a second processing node to allow for a more general application.

Adding key-value functionality to a channel-based real-time messaging system has several advantages over conventional key-value store data management platforms. For example, by maintaining a historical queue of ordered messages that contain values associated with a particular key, applications can access and operate on historical "slices" of data based on prior states of the system. For example, an application may require transaction data for a time period prior to a current time, and thus ignore the current value associated with a key, instead retrieving data from prior states, effectively recreating the state of a data store on demand. Further, functions such as, for example, filtering, aggregation, pattern recognition, and fuzzy matching may be applied.

In general, one aspect of the subject matter described in this specification relates to a computer-implemented method that includes providing a plurality of channels, wherein each channel comprises an ordered plurality of messages, wherein each channel represents a unique key, and wherein each message comprises one or more key-value pairs. A function comprising a key for identifying one of the plurality of channels and processing instructions to be applied to a subset of the key-value pairs are received. The processing instructions are applied based at least in part on the unique key.

In certain examples, the function may be received and stored at a first processing node based at least in part on the processing instructions, and the processing instructions can be applied as the key-value pairs are received at the first processing node. The processing instructions may also comprise instructions to read, write, modify and/or delete values from key-value pairs assigned to the one of the plurality of channels based on the unique key. In such cases, the function can be received at the first processing node and forwarded to a second processing node at which the processing instructions are applied.

In some implementations, the subset of messages comprises a historical series of key-value pairs, which may represent, for example, a state log for each of the plurality of channels. In such cases, application of the processing instructions to the historical series of key-value pairs can restore the channel to a prior state. In some embodiments, the processing instructions can identify patterns and/or statistical outliers in the historical series of key-value pairs. In such cases, a filter function may be applied to filter the statistical outliers from the subset of messages prior to transmitting the messages to a subscriber to the one of the plurality of channels.

In another aspect, the subject matter of this specification relates to a system that includes one or more computer processors programmed to perform operations including providing a plurality of channels, wherein each channel comprises an ordered plurality of messages, wherein each channel represents a unique key, and wherein each message comprises one or more key-value pairs. A function comprising a key for identifying one of the plurality of channels and processing instructions to be applied to a subset of the key-value pairs are received. The processing instructions are applied based at least in part on the unique key.

In certain examples, the function may be received and stored at a first processing node based at least in part on the processing instructions, and the processing instructions can be applied as the key-value pairs are received at the first processing node. The processing instructions may also comprise instructions to read, write, modify and/or delete values from key-value pairs assigned to the one of the plurality of channels based on the unique key. In such cases, the function can be received at the first processing node and forwarded to a second processing node at which the processing instructions are applied.

In some implementations, the subset of messages comprise a historical series of key-value pairs, which may represent, for example, a state log for each of the plurality of channels. In such cases, application of the processing instructions to the historical series of key-value pairs can restore the channel to a prior state. In some embodiments, the processing instructions can identify patterns and/or statistical outliers in the historical series of key-value pairs. In such cases, a filter function may be applied to filter the statistical outliers from the subset of messages prior to transmitting the messages to a subscriber to the one of the plurality of channels.

In another aspect, the subject matter of this specification relates to an article. The article includes a non-transitory computer-readable medium having instructions stored thereon that when executed by one or more computer processors cause the computer processors to perform operations including: providing a plurality of channels, wherein each channel comprises an ordered plurality of messages, wherein each channel represents a unique key, and each message comprises one or more key-value pairs. A function comprising a key for identifying one of the plurality of channels and processing instructions to be applied to a subset of the key-value pairs are received. The processing instructions are applied based at least in part on the unique key.

Elements of examples or embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4B is a data flow diagram of an example method for subscribing to a channel of a messaging system.

DETAILED DESCRIPTION

Figure 1A:
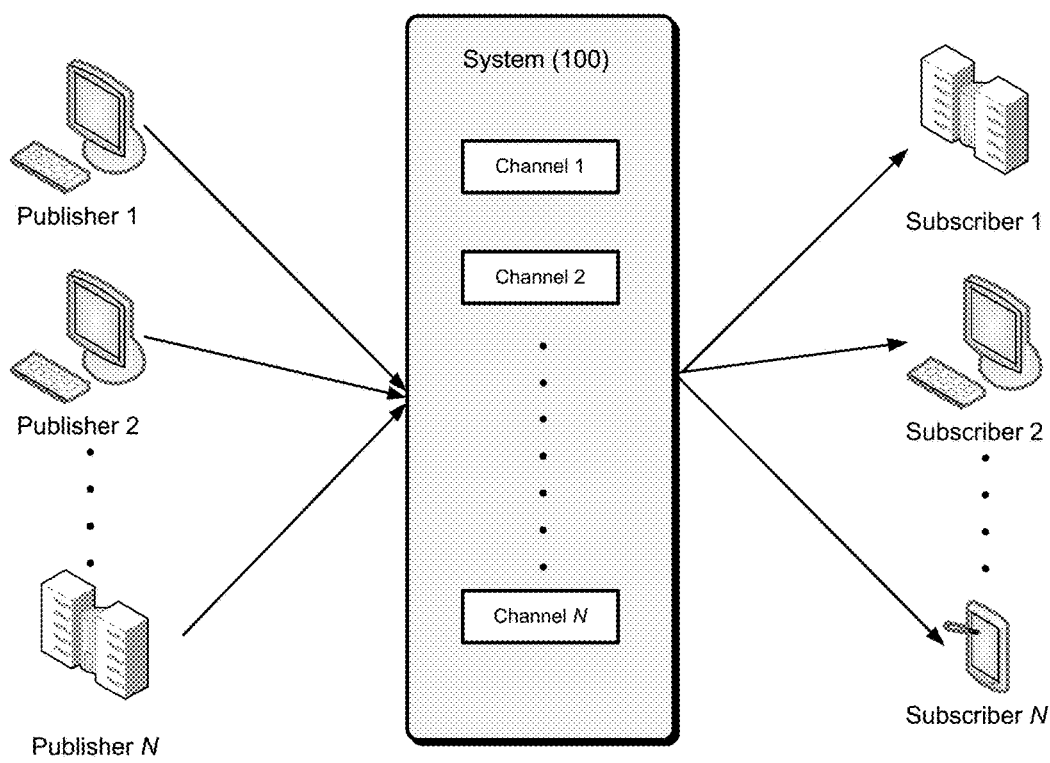
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:
  One to One (1:1). In this configuration there is one publisher and one subscriber per channel. A typical use case is private messaging.
  One to Many (1:N). In this configuration there is one publisher and multiple subscribers per channel. Typical use cases are broadcasting messages (e.g., stock prices).
  Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
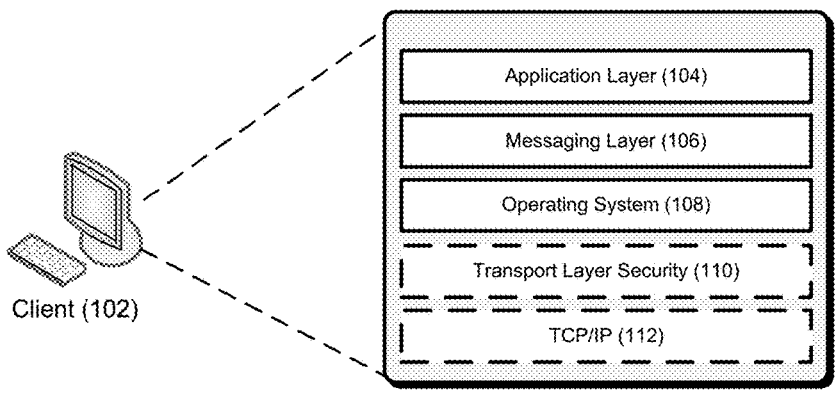
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
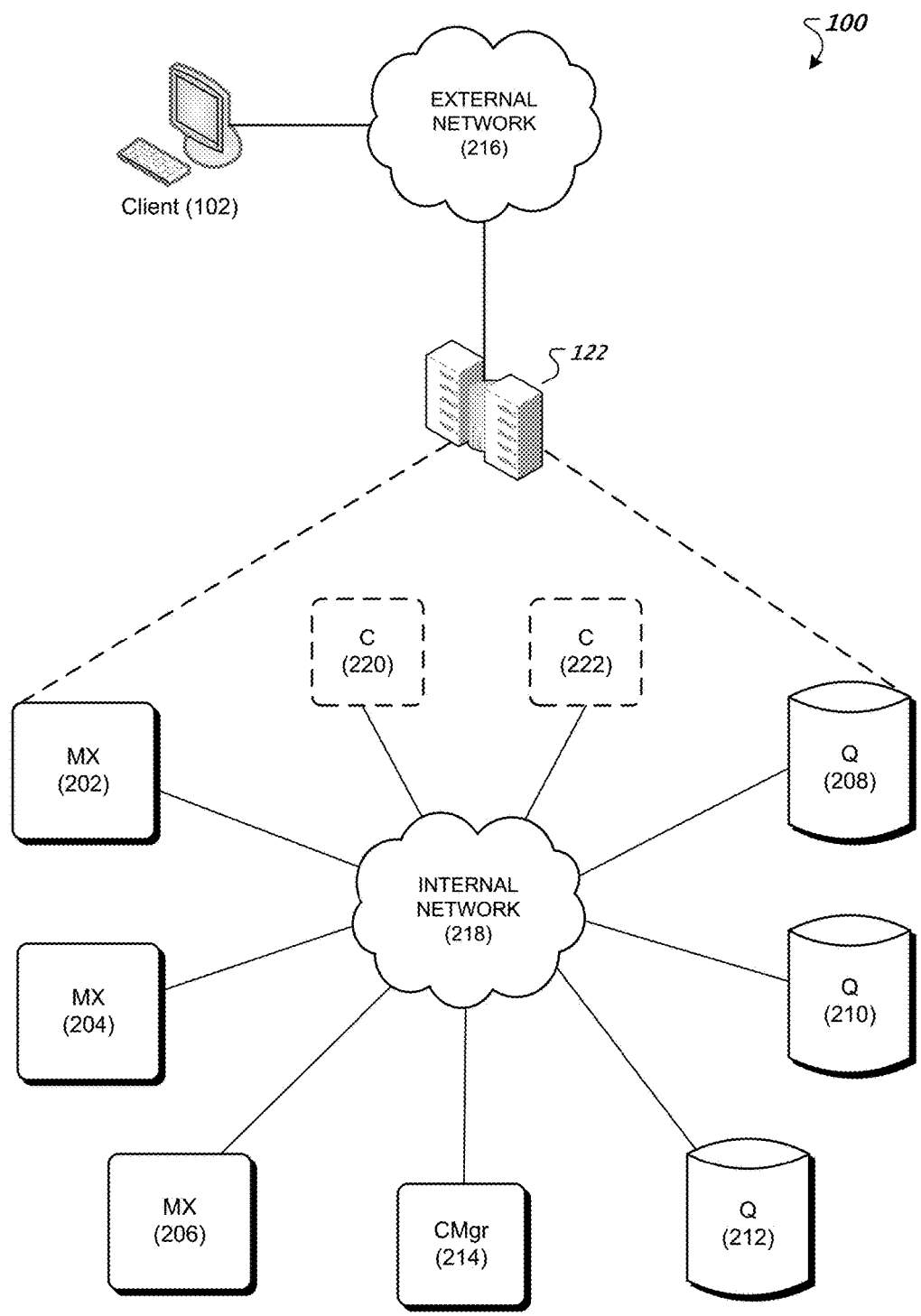
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more configuration manager nodes (e.g., configuration manager 214), and optionally one or more C nodes (e.g., C nodes or cache nodes 220 and 222). Each node can execute in a virtual machine or on a physical machine (e.g., a data processing apparatus). Each MX node can serve as a termination point for one or more publisher and/or subscriber connections through the external network 216. The internal communication among MX nodes, Q nodes, C nodes, and the configuration manager, can be conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each configuration manager node is responsible for managing Q node load, for example, by assigning channels to Q nodes and/or splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a configuration manager (e.g., configuration manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a configuration manager to grant access to a streamlet for the channel from which messages are read. If the MX node has already been granted read access to a streamlet for the channel (and the channel's TTL has not been closed to reading) the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the configuration manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a configuration manager node. The configuration manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the configuration manager to read from or write to a streamlet. The new grant will reference a different streamlet and will refer to the same or a different Q node depending on where the new streamlet resides.

Figure 3A:
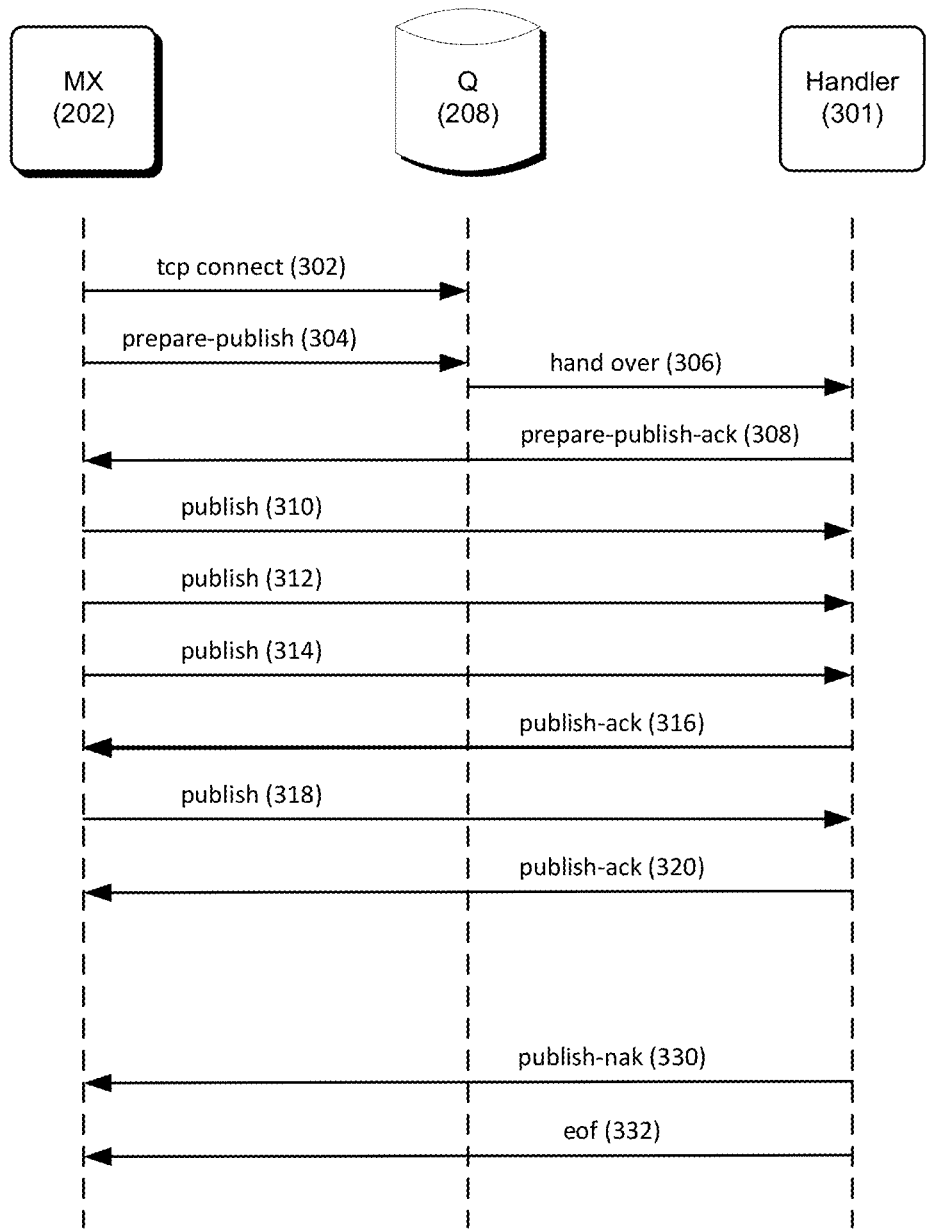
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a configuration manager (e.g., configuration manager 214), as described before, the MX node establishes a Transmission Control Protocol (TCP) connection with the Q node (e.g., Q node 208) identified in the grant response received from the configuration manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the configuration manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a configuration manager if the MX node has additional messages to store.

Figure 3B:
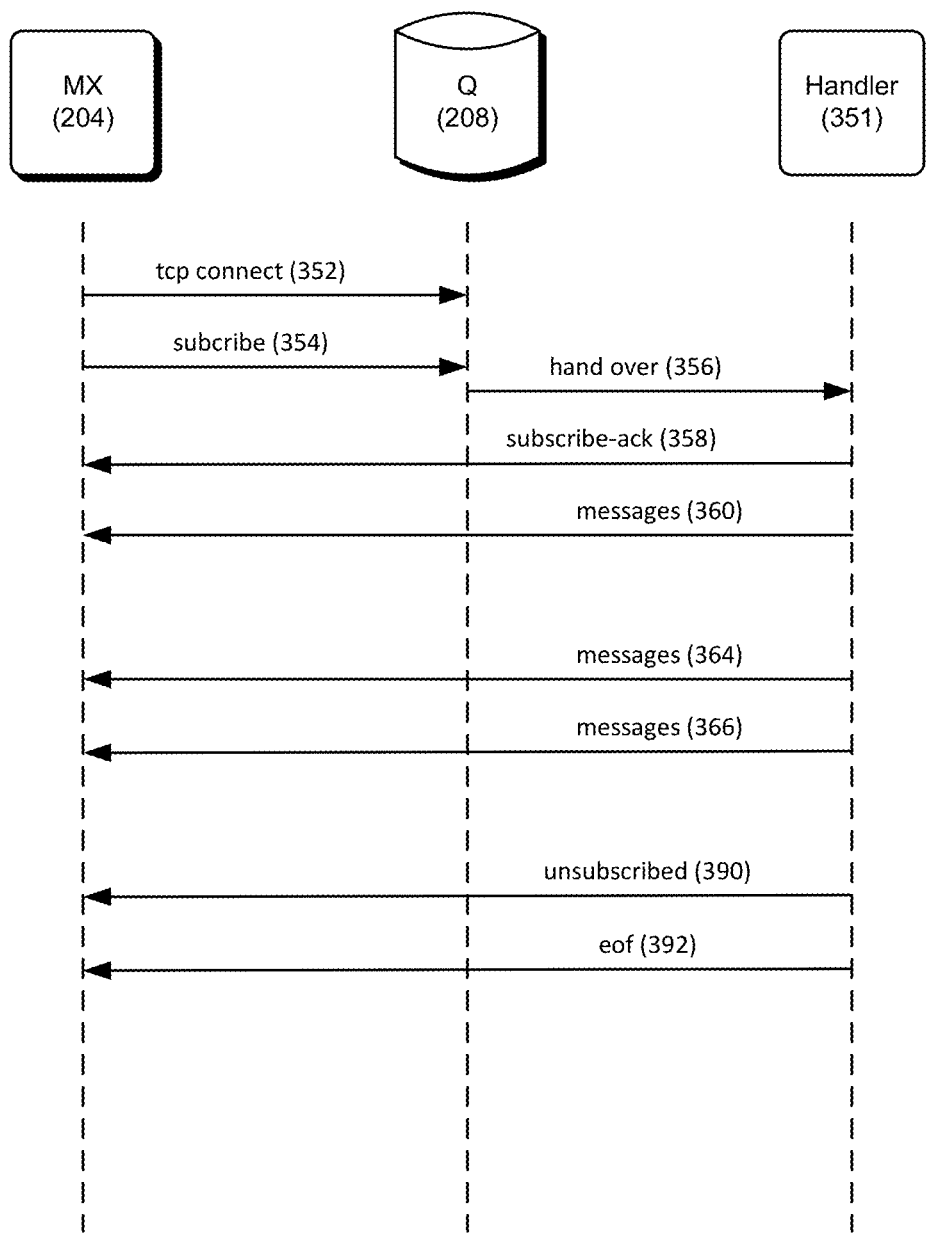
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a configuration manager (e.g., configuration manager 214) a request for reading a particular channel starting from a particular message or time offset in the channel. The configuration manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the configuration manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the configuration manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a configuration manager) can read the streamlets from the C nodes instead.

As described above, messages for a channel in the messaging system 100 are ordered in a channel stream. A configuration manager (e.g., configuration manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The configuration manager can also balance load among Q nodes in the messaging system 100 by monitoring respective workloads of the Q nodes and allocating streamlets in a way that avoids overloading any one Q node.

In various implementations, a configuration manager maintains a list identifying each active streamlet, the respective Q node on which the streamlet resides, an identification of the position of the first message in the streamlet, and whether the streamlet is closed for writing. In some implementations, Q nodes notify the configuration manager and/or any MX nodes that are publishing to a streamlet that the streamlet is closed due to being full or when the streamlet's TTL has expired. When a streamlet is closed, the streamlet remains on the configuration manager's list of active streamlets until the streamlet's TTL has expired so that MX nodes can continue to retrieve messages from the streamlet.

When an MX node requests a write grant for a given channel and there is not a streamlet for the channel that can be written to, the configuration manager allocates a new streamlet on one of the Q nodes and returns the identity of the streamlet and the Q node in the StreamletGrantResponse. Otherwise, the configuration manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the configuration manager.

When an MX node requests a read grant for a given channel and there is not a streamlet for the channel that can be read from, the configuration manager allocates a new streamlet on one of the Q nodes and returns the identity of the streamlet and the Q node in the StreamletGrantResponse. Otherwise, the configuration manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 can send an EOF message (392) to any MX nodes that are subscribed to the streamlet.

In some implementations, the messaging system 100 can include multiple configuration managers (e.g., configuration manager 214 plus one or more other configuration managers). Multiple configuration managers can provide resiliency and prevent single point of failure. For instance, one configuration manager can replicate lists of streamlets and current grants it maintains to another "slave" configuration manager. As another example, multiple configuration managers can coordinate operations between them using distributed consensus protocols, such as, for example, Paxos or Raft protocols.

Figure 4A:
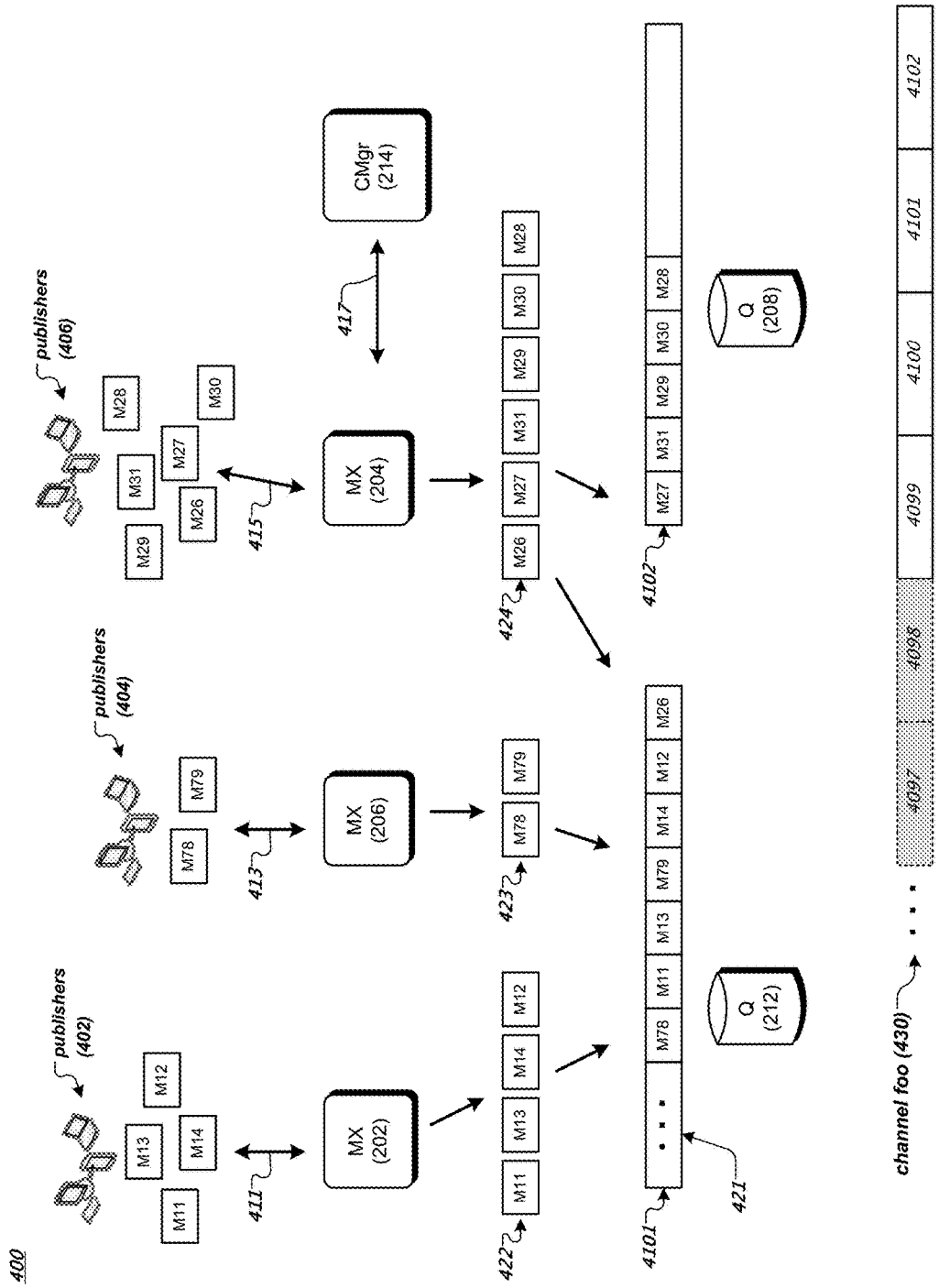
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a configuration manager (e.g., configuration manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the configuration manager 214. If the channel (specified in the subscribe request) does not yet exist in the messaging system 100, the configuration manager can create and maintain a new channel in the messaging system 100. For instance, the configuration manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the configuration manager 214 that allows the MX node to store the messages in a streamlet of the channel foo. For instance, the MX node 202 receives a grant from the configuration manager 214 to write messages M11, M12, M13, and M14 to a streamlet 4101 on the Q node 212. The MX node 206 receives a grant from the configuration manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other acknowledgement scheduling algorithms, such as Nagle's algorithm, can be used.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the configuration manager 214 to write to the channel foo. The configuration manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the configuration manager 214 for additional messages (e.g., M27, M31, and so on) for the channel foo.

The configuration manager 214 can monitor available Q nodes in the messaging system 100 for their respective workloads (e.g., how many streamlets are residing in each Q node). The configuration manager 214 can allocate a streamlet for the write request from the MX node 204 such that overloading (e.g., too many streamlets or too many read or write grants) can be avoided for any given Q node. For instance, the configuration manager 214 can identify a least loaded Q node in the messaging system 100 and allocate a new streamlet on the least loaded Q node for write requests from the MX node 204. In the example of FIG. 4A, the configuration manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the configuration manager 214 allocates a new streamlet (e.g., streamlet 4102) for a request for a grant from an MX node (e.g., MX node 204) to write to a channel (e.g., foo), the configuration manager 214 assigns to the streamlet its TTL, which will expire after TTLs of other streamlets that are already in the channel's stream. For instance, the configuration manager 214 can assign to each streamlet of the channel foo's channel stream a TTL of 3 minutes when allocating the streamlet. That is, each streamlet will expire 3 minutes after it is allocated (created) by the configuration manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
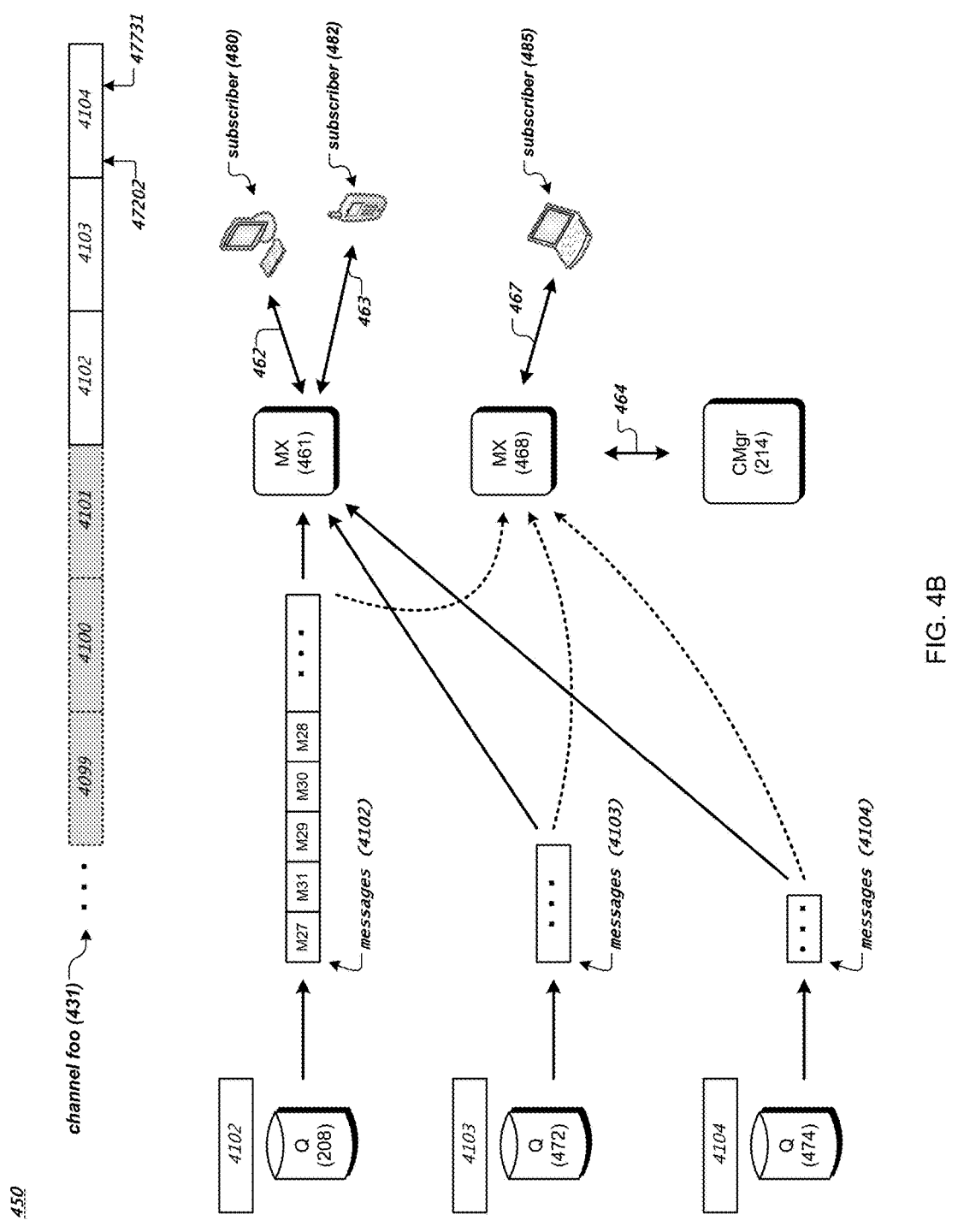

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the configuration manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the configuration manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the configuration manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other acknowledgement scheduling algorithms, such as Nagle's algorithm, can be used.

After receiving the last message in the streamlet 4102, the MX node 461 can send an acknowledgement to the Q node 208, and send to the configuration manager 214 another request (e.g., for a read grant) for the next streamlet in the channel stream of the channel foo. Based on the request, the configuration manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the configuration manager 214 yet another request for a read grant for messages in the next streamlet 4104 (on Q node 474). After receiving the read grant, the MX node 461 retrieves message of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q node 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective times-to-live that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the configuration manager 214 a request for a read grant for messages starting at the position 47202. Based on the request, the configuration manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The configuration manager 214 maintains the ordered sequence of streamlets as they are created throughout their respective times-to-live. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages. Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
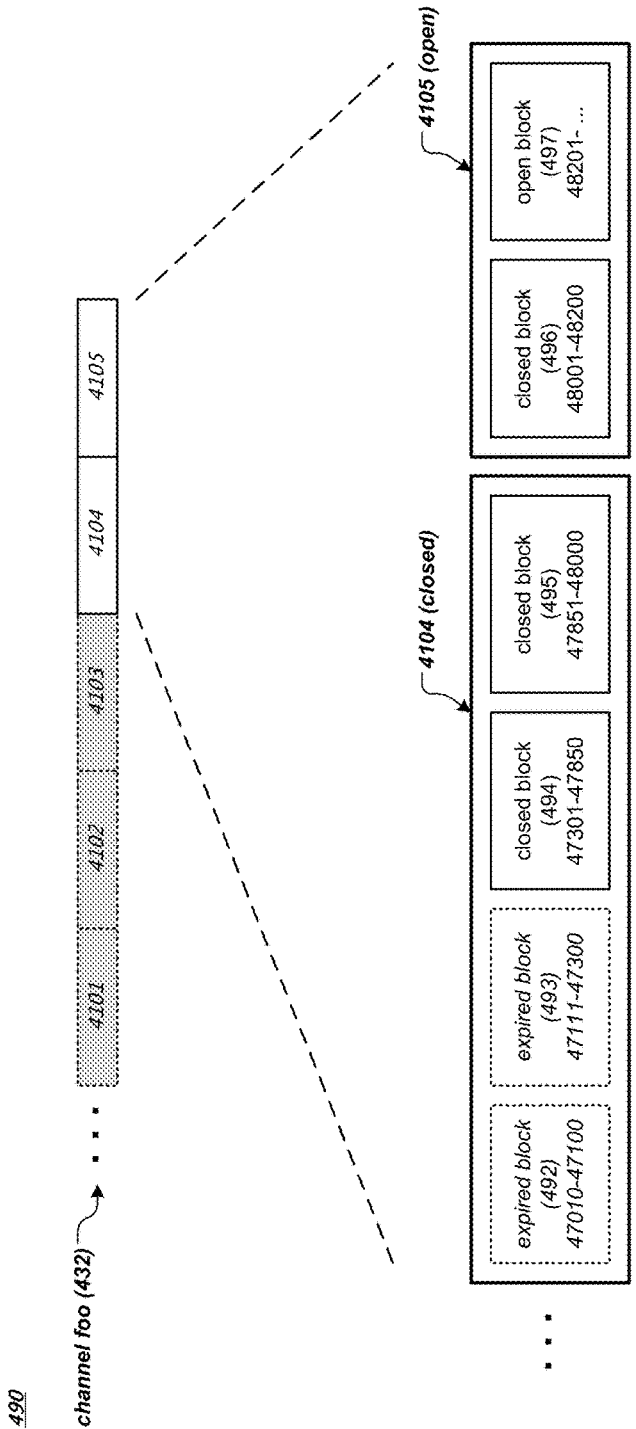
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

As described above, a streamlet (a data buffer) residing on a Q node stores messages of a channel in the messaging system 100. To prevent failure of the Q node (a single point failure) that can cause messages being lost, the messaging system 100 can replicate messages on multiple Q nodes, as described in more detail below.

Figure 5A:
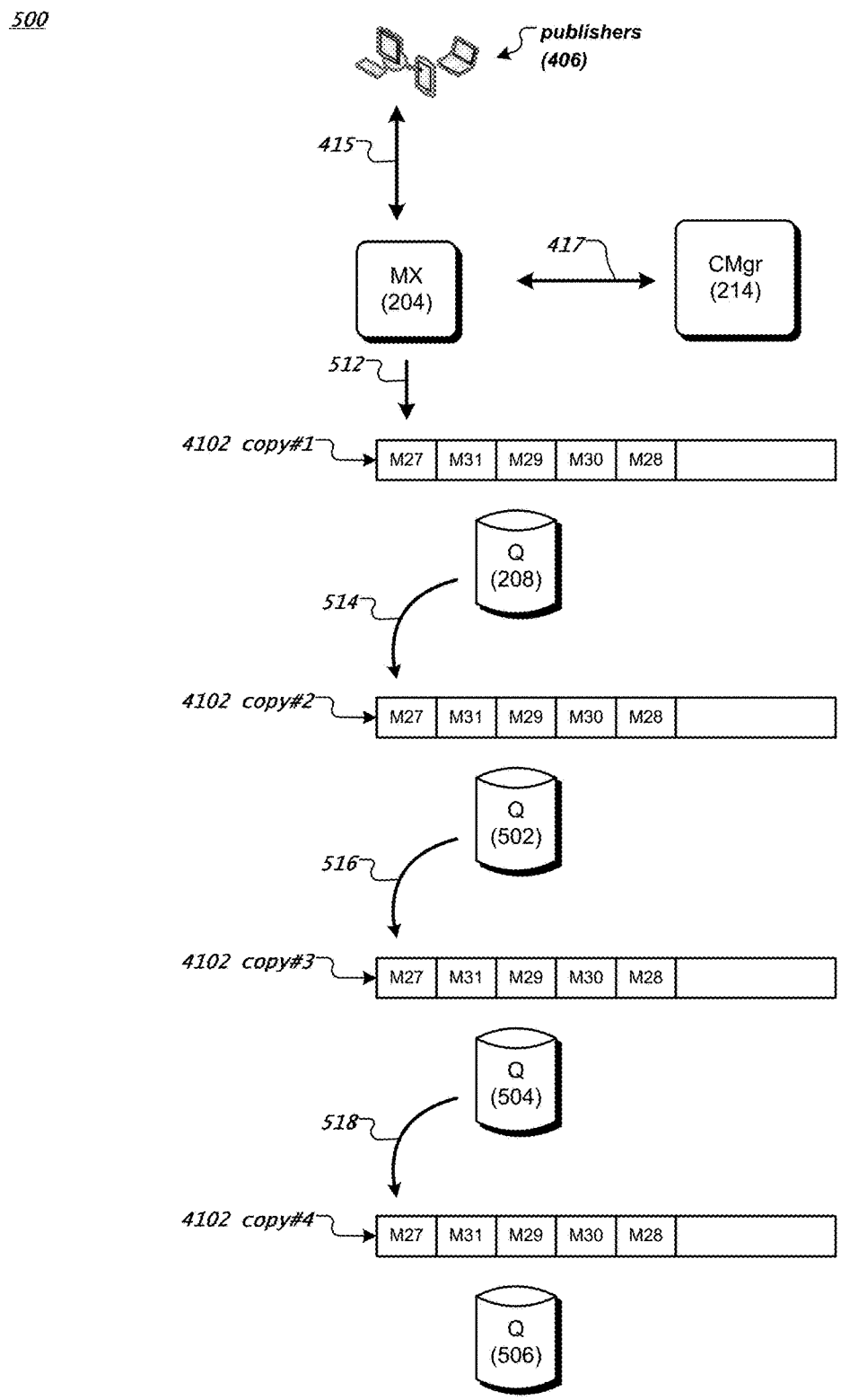
FIG. 5A is a data flow diagram of an example method for publishing and replicating messages of a messaging system.

FIG. 5A is a data flow diagram of an example method 500 for publishing and replicating messages of the messaging system 100. As described earlier in reference to FIG. 4A, the MX node 204 receives messages (of the channel foo) from the publishers 406. The configuration manager 214 can instruct the MX Node 204 (e.g., with a write grant) to store the messages in the streamlet 4102 on the Q node 208. In FIG. 5A, instead of storing the messages on a single node (e.g., Q node 208), the configuration manager 214 allocates multiple Q nodes to store multiple copies of the streamlet 4102 on these Q nodes.

By way of illustration, the configuration manager 214 allocates Q nodes 208, 502, 504, and 506 in the messaging system 100 to store copies of the streamlet 4102. The configuration manager 214 instructs the MX node 204 to transmit the messages for the channel foo (e.g., messages M27, M31, M29, M30, and M28) to the Q node 208 (512). A computing process running on the Q node 208 stores the messages in the first copy (copy #1) of the streamlet 4102. Instead of sending an acknowledgement message to the MX node 204 after storing the messages, the Q node 208 forwards the messages to the Q node 502 (514). A computing process running on the Q node 502 stores the messages in another copy (copy #2) of the streamlet 4102. Meanwhile, the Q node 502 forwards the messages to the Q node 504 (516). A computing process running on the Q node 504 stores the messages in yet another copy (copy #3) of the streamlet 4102. The Q node 504 also forwards the message to the Q node 506 (518). A computing process running on the Q node 506 stores the messages in yet another copy (copy #4) of the streamlet 4102. The Q node 506 can send an acknowledgement message to the MX node 204, indicating that all the messages (M27, M31, M29, M30, and M28) have been stored successfully in streamlet copies #1, #2, #3 and #4.

In some implementations, after successfully storing the last copy (copy #4), the Q node 506 can send an acknowledgement to its upstream Q node (504), which in turns sends an acknowledgment to its upstream Q node (502), and so on, until the acknowledgement is sent to the Q node 208 storing the first copy (copy #1). The Q node 208 can send an acknowledgement message to the MX node 204, indicating that all messages have been stored successfully in the streamlet 4102 (i.e., in the copies #1, #2, #3 and #4).

In this way, four copies of the streamlet 4102 (and each message in the streamlet) are stored in four different Q nodes. Other numbers (e.g., two, three, five, or other suitable number) of copies of a streamlet are also possible. In the present illustration, the four copies form a chain of copies including a head copy in the copy #1 and a tail copy in the copy #4. When a new message is published to the streamlet 4102, the message is first stored in the head copy (copy #1) on the Q node 208. The message is then forwarded downstream to the next adjacent copy, the copy #2 on the Q node 502 for storage, then to the copy #3 on the Q node 504 for storage, until the message is stored in the tail copy the copy #4 on the Q node 506.

In addition to storing and forwarding by messages, the computing processes running on Q nodes that store copies of a streamlet can also store and forward messages by blocks of messages, as described earlier in reference to FIG. 4C. For instance, the computing process storing the copy #1 of the streamlet 4102 on Q node 208 can allocate memory and store a block of, for example, 200 kilobytes of messages (although other sizes of blocks of messages are possible), and forward the block of messages to the next adjacent copy (copy #2) of the chain for storage, and so on, until the block messages is stored in the tail copy (copy #4) on the Q node 506.

Figure 5B:
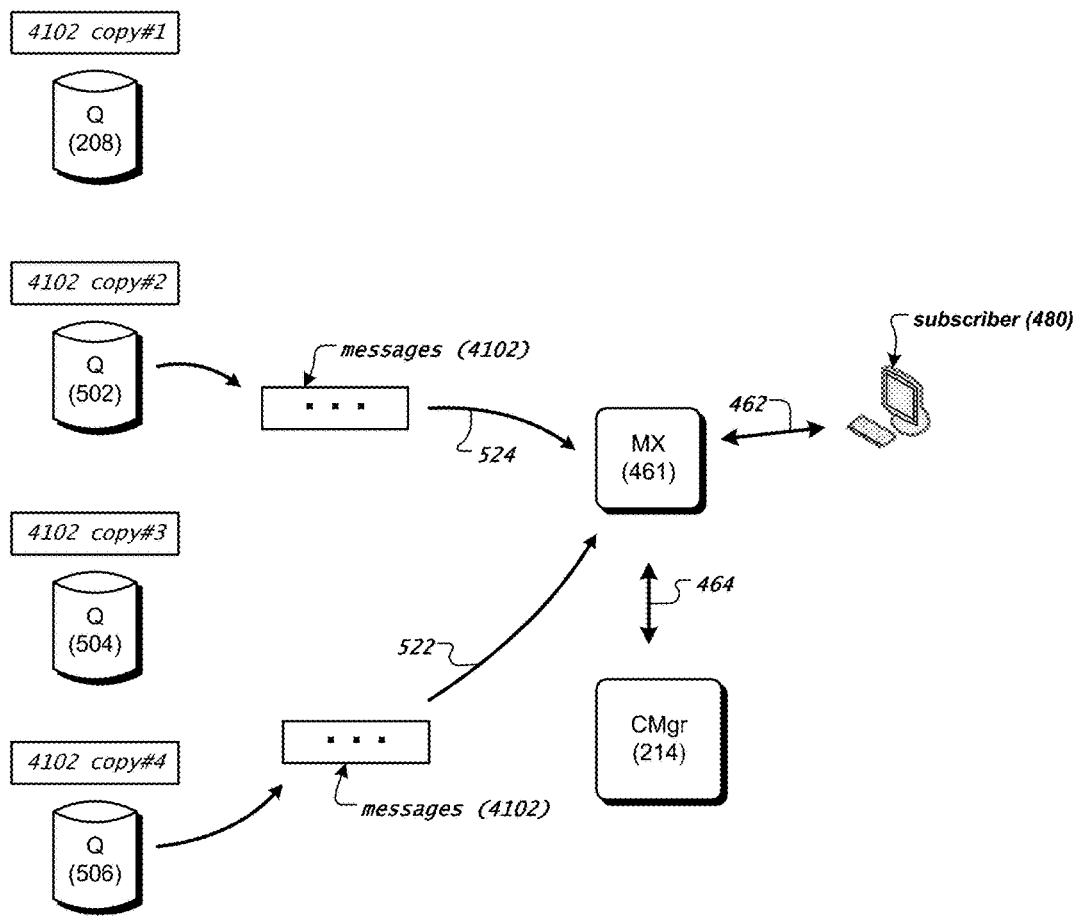
FIG. 5B is a data flow diagram of an example method for retrieving stored messages in a messaging system.

Messages of the streamlet 4102 can be retrieved and delivered to a subscriber of the channel foo from one of the copies of the streamlet 4102. FIG. 5B is a data flow diagram of an example method 550 for retrieving stored messages in the messaging system 100. For instance, the subscriber 480 can send a request for subscribing to messages of the channel to the MX node 461, as described earlier in reference to FIG. 4B. The configuration manager 214 can provide to the MX node 461 a read grant for one of the copies of the streamlet 4102. The MX node 461 can retrieve messages of the streamlet 4102 from one of the Q nodes storing a copy of the streamlet 4102, and provide the retrieved messages to the subscriber 480. For instance, the MX node 461 can retrieve messages from the copy #4 (the tail copy) stored on the Q node 506 (522). As for another example, the MX node 461 can retrieve messages from the copy #2 stored on the Q node 502 (524). In this way, the multiple copies of a streamlet (e.g., copies #1, #2, #3, and #4 of the streamlet 4102) provide replication and redundancy against failure if only one copy of the streamlet were stored in the messaging system 100. In various implementations, the configuration manager 214 can balance workloads among the Q nodes storing copies of the streamlet 4102 by directing the MX node 461 (e.g., with a read grant) to a particular Q node that has, for example, less current read and write grants as compared to other Q nodes storing copies of the streamlet 4102.

A Q node storing a particular copy in a chain of copies of a streamlet may fail, e.g., a computing process on the Q node storing the particular copy may freeze. Other failure modes of a Q node are possible. An MX node can detect a failed node (e.g., from non-responsiveness of the failed node) and report the failed node to a configuration manager in the messaging system 100 (e.g., configuration manager 214). A peer Q node can also detect a failed Q node and report the failed node to the configuration manager. For instance, an upstream Q node may detect a failed downstream Q node when the downstream Q node is non-responsive, e.g., fails to acknowledge a message storage request from the upstream Q node as described earlier. It is noted that failure of a Q node storing a copy of a particular streamlet of a particular channel stream does not have to be for publish or subscribe operations of the particular streamlet or of the particular channel stream. Failure stemming from operations on another streamlet or another channel stream can also alert a configuration manager about failure of a Q node in the messaging system 100.

Figure 5C:
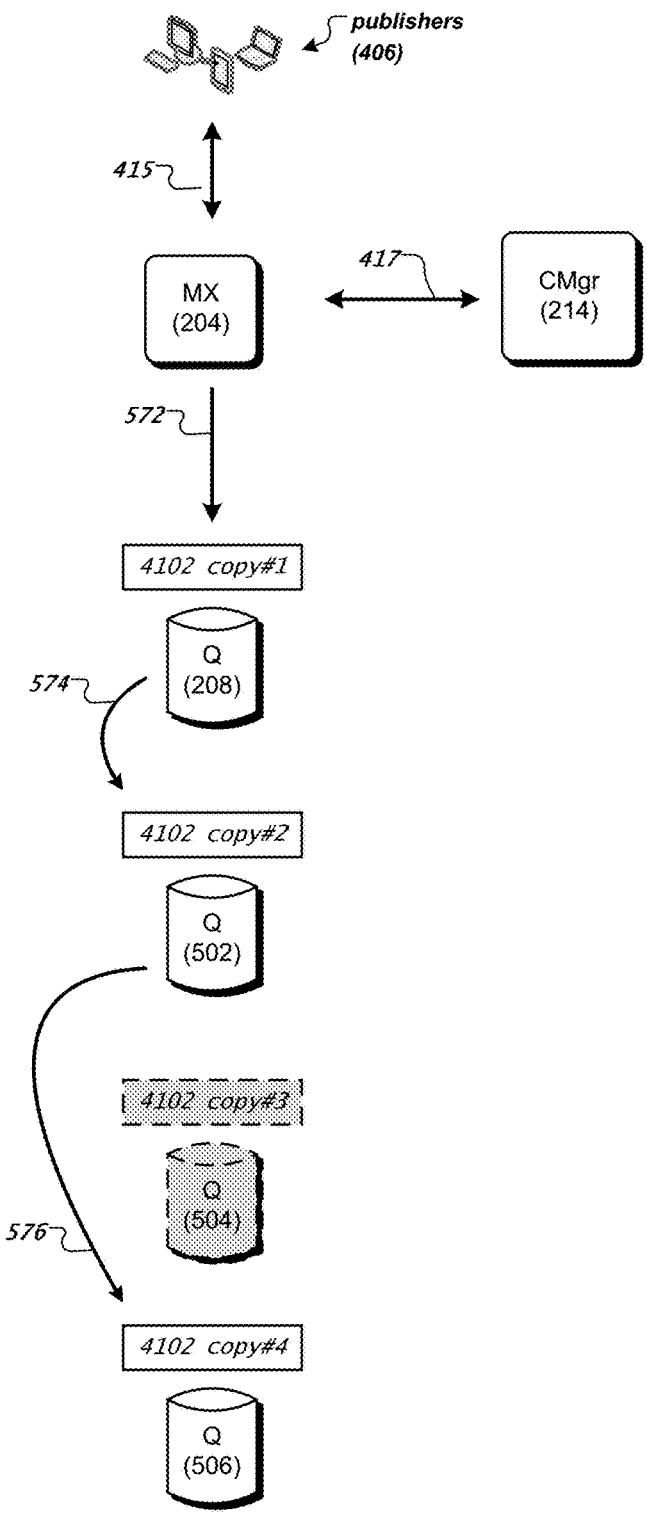
FIGS. 5C and 5D are data flow diagrams of example methods for repairing a chain of copies of data in a messaging system.
Figure 5D:
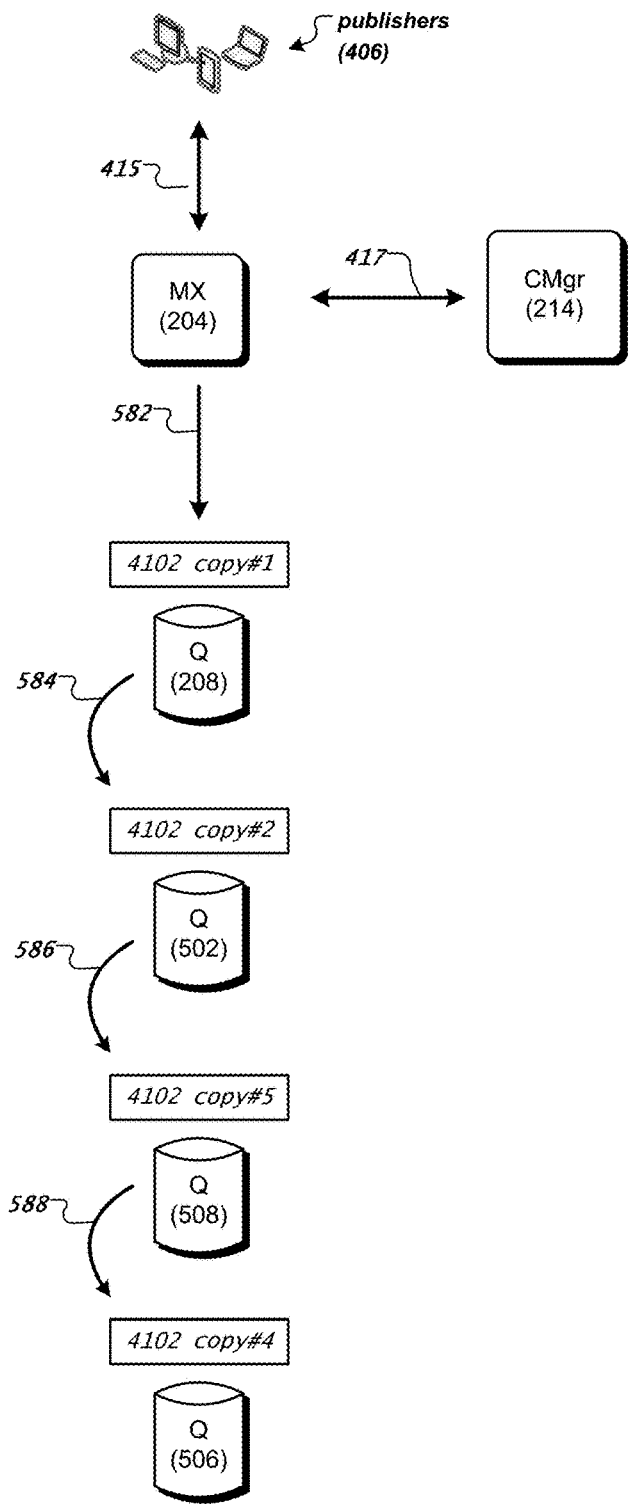

When a Q node storing a particular copy in a chain of copies of a streamlet fails, a configuration manager in the messaging system 100 can repair the chain by removing the failed node, or by inserting a new node for a new copy into the chain, for example. FIGS. 5C and 5D are data flow diagrams of example methods for repairing a chain of copies of a streamlet in the messaging system 100. In FIG. 5C, for instance, after detecting that the Q node 504 fails, the configuration manager 214 can repair the chain of copies by redirecting messages intended to be stored in the copy #3 of the streamlet 4102 on the Q node 502 to the copy #4 of the streamlet 4102 on the Q node 506. In this example, a message (or a block of messages) is first sent from the MX node 204 to the Q node 208 for storage in the copy #1 of the streamlet 4102 (572). The message then is forwarded to the Q node 502 for storage in the copy #2 of the streamlet 4102 (574). The message is then forwarded to the Q node 506 for storage in the copy #4 of the streamlet 4102 (576). The Q node 506 can send an acknowledgement message to the configuration manager 214 indicating that the message has been stored successfully.

Here, a failed node can also be the node storing the head copy or the tail copy of the chain of copies. For instance, if the Q node 208 fails, the configuration manager 214 can instruct the MX node 204 first to send the message to the Q node 502 for storage in the copy #2 of the streamlet 4102. The message is then forwarded to the next adjacent copy in the chain for storage, until the message is stored in the tail copy.

If the Q node 506 fails, the configuration manager 214 can repair the chain of copies of the streamlet 4102 such that the copy #3 on the Q node 504 becomes the tail copy of the chain. A message is first stored in the copy #1 on the Q node 208, then subsequently stored in the copy #2 on the Q node 502, and the copy #3 on the Q node 504. The Q node 504 then can send an acknowledgement message to the configuration manager 214 indicating that the message has been stored successfully.

In FIG. 5D, the configuration manager 214 replaces the failed node Q 504 by allocating a new Q node 508 to store a copy #5 of the chain of copies of the streamlet 4102. In this example, the configuration manager 214 instructs the MX node 204 to send a message (from the publishers 406) to the Q node 208 for storage in the copy #1 of the streamlet 4102 (582). The message is then forwarded to the Q node 502 for storage in the copy #2 of the streamlet 4102 (584). The message is then forwarded to the Q node 508 for storage in the copy #5 of the streamlet 4012 (586). The message is then forwarded to the Q node 506 for storage in the copy #4 of the streamlet 4102 (588). The Q node 506 can send an acknowledgement message to the configuration manager 214 indicating that the message has been stored successfully.

A key-value store or key-value database is a database that uses an associative array such as a map or dictionary as the fundamental data model where each key is associated with one and only one value in a collection. One example of a key-value store is the Domain Name System (DNS), which matches names of websites to numbers—the IP address for the website. While a key-value store may work well for single-state systems (e.g., systems where users are only concerned with the current value associated with a key), their structure is not meant to store, process and retrieve temporally-based data where values associated with keys change over time, and users often want access to historical data and/or recreate a previous state based on such messages.

In various embodiments of the present invention, the PubSub system described herein may be utilized as an enhanced key-value store, and, as such, expand the capabilities of conventional key-value-based data systems. In particular, the PubSub system supports channel-like subscription mechanics for key-value pairings. In certain instances, each channel in the PubSub system can be addressed or otherwise referred to as a "key" (e.g., the channel name can be the key), and each message published to each channel may be referred to as a "value" associated with the key. Because the PubSub system maintains queues of separately addressable messages organized by channel, a continuous state-history can be stored, updated, and retrieved not only for the current state (i.e., value) but for historical data as well.

Initially, a set of read/write operations are provided for committing and retrieving values (message content), preferably without creating new channels (if, for example, the key provided for the value does not exist), but which can modify values associated with a particular key. For example, a "read" operation can retrieve the value for a specified key, although such a read operation may create a channel if it does not already exist. A read operation can have similar or same behavior as that of a subscribe operation discussed previously. A "write" operation can modify a value of a specified key. A write operation can have similar or same behavior as that of a publish operation discussed previously. However, in order to update a value associated with a particular key (either in total, partially, or as a function of one or more existing values), a stored lambda function (discussed in more detail below) is applied. The pseudo-code below illustrates an exemplary write operation using a key-value pairing in the real-time messaging system described above, where the "key" is the channel identified as "my.house.inhabitants" and the "values" are the name, age and various properties for each member of the household:

```
{
    "action": "rtm/write",
    "body": {
        "key": "my.house.inhabitants",
        "value": [{
            "name": "Amigo Del Hombre",
            "age": 24,
            "properties": {
                "hair": "marrón",
                "paws": 4,
                "speed": {
                    "value": 30,
                    "unit": "mph"
                }
            }
        }]
    },
    "id:" 42
}
```

Note that in the above example, the key-values may be hierarchical. In some instances, the user can define the TTL for a key in a write operation. The pseudo-code below illustrates an exemplary write operation in which a TTL (e.g., 3600 seconds) has been defined for the "key" identified as "my.house.occupancy" having a corresponding "value" of 5:

```
{
    "action": "rtm/write",
    "body": {
        "key": "my.house.occupany",
        "value": 5,
        "ttl": 3600
    }
    "id": 47
}
```

In addition to the read and write functions, a delete operation effectively "removes" the key and makes the key (i.e., channel) unavailable to any (or some set of) requestor (s). In some cases, continuity for changes of the keys is maintained by inserting a special "deleted" mark (or other suitable sign of deletion) as a separate message instead of instantly deleting the specified key-values, thus providing temporary access to recently deleted values. In some cases, the deleted messages are maintained for a set period of time (e.g., one second or other suitable time period), whereas in other cases the delete function can include a period parameter that defines the number of periods (e.g., 30 minutes or other suitable time period) to maintain the deleted record. In some cases, there may be multiple "deleted" marks in the message stream, allowing subscriptions from any position within the stream that will also provide a history of the channel including deletions. In the special case that the delete mark is in the rightmost (e.g., most recent) position indicating that the current value for that particular key is <<null>>, there is no value associated with the requested key, so for any read operation such key will not exist (from the subscriber perspective). Consequently, a "no such key" or similar indication can be returned to the subscriber (the key would also not be returned in search results). The pseudo-code below illustrates the delete function based on the "my.house.inhabitants" key where the value associated with id=43 is noted as deleted:

```
{
    "action": "rtm/delete",
    "body": {
        "key": "my.house.inhabitants",
    },
    "id": 43
}
```

It is noted that the delete function can take either a "key" or a "channel" in the body of such pseudo-code. It is also noted that a delete operation could occur when at least one subscription is active. In such an instance, the subscriber can be notified about the deletion by being sent a suitable information message, such as that used for out-of-sync cases. Additionally or alternatively, a fast-forwarding mechanism can be implemented for such subscriptions. The fast-forwarding mechanism can automatically move the stream position of the subscriber forward to the most current data if the previous data has been deleted (and, therefore, is no longer accessible).

More complex functions may be implemented using a stored function, referred to herein as a lambda (λ) function, that may be applied against messages within the channel(s) based on key values. A user can specify a lambda function that can be called for each write operation. The lambda function can, for example, receive both old and new values and produce an output that becomes the new value of the key. The lambda function can also generate a suitable additional event (e.g., publish a message to a channel, change a value of some other keys, etc.). The PubSub system can store the lambda functions and delete them when their respective TTLs expire. Thus, such functionality may be used to apply a user or application-defined function to a set of keys and values distributed across multiple Q nodes, and, in some cases, process the output using another user-defined function on one or more MX nodes (e.g., on the MX node terminating the subscriber connection).

For purposes of illustration and not limitation, one such function, "cluster search," can be a read-only operation that looks for values associated with particular keys. Such an operation can be performed by all (or some set of) Q nodes in a chain that participate in a part of the processing so that the resulting load can be distributed across Q nodes in the system. The pseudo-code below illustrates an example of such a "cluster search" function:

```
{
    "action": "rtm/cluster_search",
    "body": {
        "select": {
            "lambda": "find_accounts_transferred_to",
            "args": "[1234567890, "$key", "$value"]
        },
        "merge": {
            "lambda": "unique",
            "args": ["$key", "$value"]
        }
    },
    "id": 45
}
```

In some implementations, a "select lambda" function may be used to merge data at each Q node selected from multiple keys for subsequent additional merging at certain MX nodes at selected (or arbitrary) points in time. By merging data from each Q node prior to transmission to the MX nodes, the amount of data transmitted between Q nodes and MX nodes can be reduced. An example of such a select lambda function that counts the number of records that include the value "abc" and reruns that count is detailed below:

```
function select_lambda(report_quantum) {
    counter = 0;
        while(kv = read( )) {
            if(kv.key.contains('abc')) { counter++; }
            if(counter >= report_quantum) | write('counter',
    counter); counter = 0; }
}
    if(counter > 0)
        write('counter', counter);
}
function merge_lambda( ) {
    counter = 0;
    while(kv = read( )) { counter += kv.value; }
    write('counter', counter);
}
```

In some embodiments, a fuzzy key search function may be implemented along with a cluster search to facilitate the location of existing keys with a user defined filtering mechanism. Such a fuzzy key search function can use an API similar to that of the cluster search function, where the merge can default to pass everything through the system. An exemplary request and response is detailed below:

```
REQUEST:
{
    "action": "rtm/search",
    "body": {
        "prefix": "apple"
    },
    "id": 46
}
RESPONSE:
{
    "action": "rtm/search/data"
    "body": {
        "result": [
                "appleseeds",
                "apples",
                "apple incorporated"
            ],
        "final": true | false
    },
    "id": 46
}
or/and // since there is a series of rtm/search/data messages, an incomplete
         // response is one of the possible options that may result
{
    "action": "rtm/search/error"
    "body": {
        "error": "Timeout",
        "error_text": ""
    },
    "id": 46
}
```

Because the messages are maintained for some period of time, each channel can operate as a change log detailing the state of the channel. In KV parlance, the value for the key at any point in time, for any slice of time, and can be rolled back to any previous state by selecting and applying the appropriate lambda function against any set of historical messages. In effect, the message queues at each channel operate as a cache of events occurring against a specific key, and subscribers can selectively access and/or process these events based on user and application specific functions. By maintaining a historical state log of the key-value pairs for a channel, the lambda (λ) function may also be used to identify patterns in the key-value parings by performing regression analysis, best-fit algorithm, and/or other statistical applications. In some instances, thresholds may be used to identify statistical outliers in the series of values for each channel, and, if desired, filter the outliers prior to or as the messages are being sent to the subscribers.

Some implementations allow for the application of the lambda (λ) function at various points in the data management process. For example, the lambda (λ) function may be applied at ingress, that is when messages are received at an MX node from a publisher as a new key-value pair such that the lambda (λ) function is applied prior to forwarding the message to the corresponding Q node. In some cases, the lambda (λ) function may be applied at commit when the values are stored at the Q node, thus it is applied to all messages. In other cases, the lambda (λ) function may be applied at egress as messages are forwarded from a Q node to an MX node and thus applied for specific subscribers or applications. In effect, application of the lambda (λ) function at egress acts as a filter on values being transmitted from each channel.

Moreover, the retention policy for each key can be configurable. For example, values may be stored for a particular amount of time (e.g., three days, ten minutes, etc.), count (e.g., retain a maximum of n values), memory allocation (e.g., retain values so long as the amount of memory necessary to store the values does not exceed some limit or cache value), or most recent n values. In some instances, a user-defined parameter (e.g., "total") may be used as part of the "write" function when creating a key to define the maximum number of keys. The policy can be applied for each key/channel.

Any suitable user- or application-defined function can be created, implemented, used, and stored for a lambda (λ) function. The lambda (λ) functions can be created, implemented, used, stored, or otherwise provided on any suitable basis within the PubSub system, including, for example, on a per publish basis, on a per subscription basis, on a per project (or application) basis (e.g., that may or may not be specified in a publish/subscribe request), and/or on a per installation basis. Additionally, the lambda (λ) functions can be configured and customized in any suitable manner. For example, a lambda (λ) function can be configured to execute in response to one or more system events or execute in conjunction with one or more system operations. Lambda (k) functions can be stored by the PubSub system (as discussed previously) and, in some instances, be assigned appropriate names to allow their use as part of incoming requests. Additionally, a suitable role-based authorization mechanism can be used to extend the features and functionality of lambda (λ) functions. For example, an administrator of an application can create a set of roles and/or set appropriate permissions that can define who can run which lambda (λ) functions, thereby providing additional flexibility in configuring accesses of the system.

Figure 6:
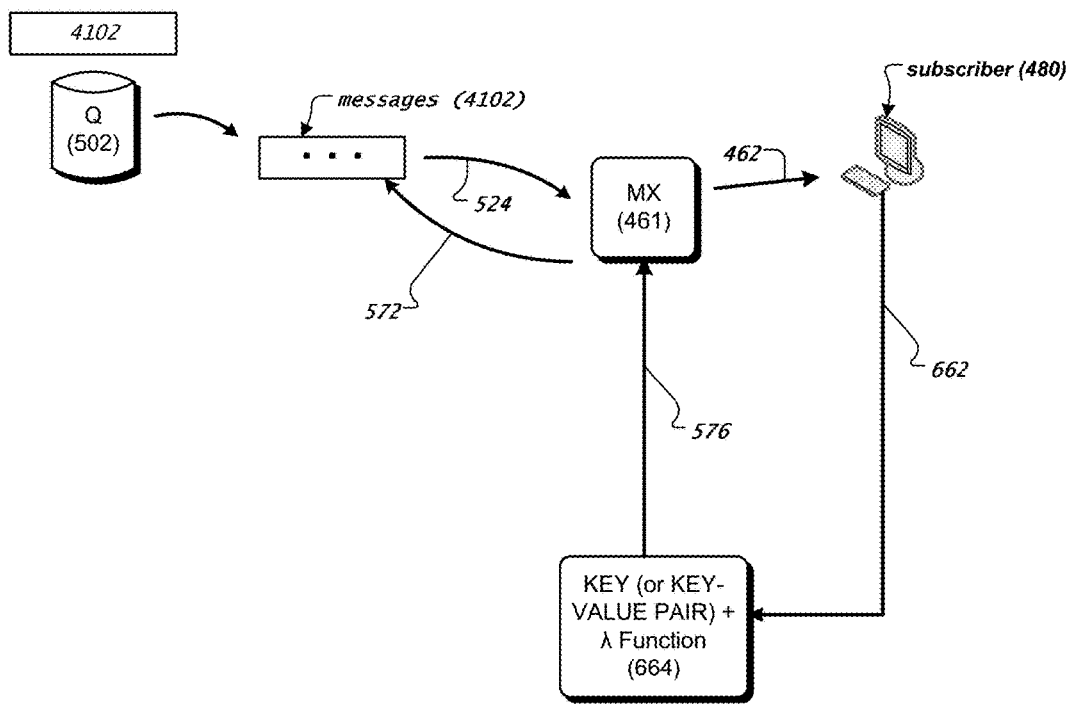
FIG. 6 is data flow diagram of an exemplary key-value data processing system implemented within a messaging system.

Referring to FIG. 6, system 600 illustrates how subscriber 480 (e.g., a client device, application, user, etc.) provides read/write/delete/processing instructions in the form of a lambda (λ) function that is applied against messages within the channel(s) based on key values. The subscriber 480 transmits instructions in the form of executable program (e.g., Javascript for application on JSON data types or other suitable programming language) via connection 662. For read operations, the instructions can include a key value plus a lambda (λ) function (664) that is to be applied against messages that match the specified key value. For write operations, the instructions can include a key-value pair plus a lambda (λ) function (664) that is to be applied against messages that match the specified key value. The functions are delivered to the MX node (461), where a determination is made as to whether to forward the instructions via connection 572 on to the appropriate Q node (502) or retained at the MX node (461). Functions that are applied on write or update are forwarded to the Q node (502) (along with the key-value pair) for processing of messages at that node as the messages are received and stored. For example, the lambda (λ) function can be applied on the Q node (502) to both old and new values to produce an output that becomes the new key value. Functions that are applied on read remain at the MX node (461) and applied as messages are received at the MX node (461) from the Q node (502), for example, to generate a new value that can be returned to the subscriber. As described above, the lambda (λ) function may be directed to messages (4102) at specific Q nodes or against all messages received at a particular MX node (e.g., on a per-subscriber basis).

Figure 7:
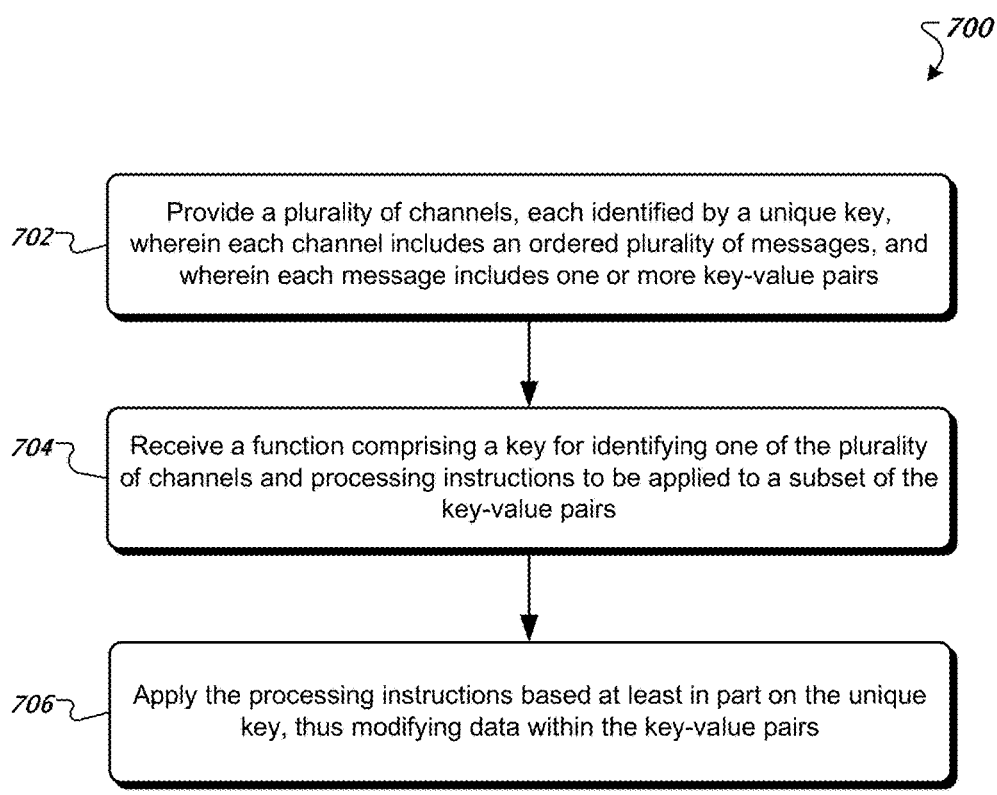
FIG. 7 is a flow chart illustrating an exemplary process for applying a key-value data processing system implemented within a messaging system.

FIG. 7 illustrates a method for implementing certain embodiments of the techniques and systems described above. A plurality of channels is provided (Step 702). Each channel comprises an ordered plurality of messages, wherein each channel represents a unique key, and each message comprises one or more key-value pairs. A function is received (Step 704). The function comprises a key for identifying one of the plurality of channels and processing instructions to be applied to a subset of the key-value pairs. The processing instructions are then applied, based at least in part on the unique key, thereby modifying data within the key-value pairs (Step 706).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of data management using a key-value structure, comprising:
    providing a plurality of channels, wherein each channel comprises a plurality of messages published to the channel according to an order, wherein the plurality of messages are provided to one or more subscribers of the channel according to the order, wherein each channel is associated with a respective key, wherein at least one key is associated with a respective time-to-live, wherein the at least one key becomes unavailable when the respective time-to-live expires, and wherein each message comprises one or more key-value pairs;
    receiving, by one or more computer processors, a function comprising a key for identifying one of the plurality of channels and processing instructions to be applied to a subset of the key-value pairs; and
    applying the processing instructions based at least in part on the key.

2. The method of claim 1, wherein the function is received and stored at a first processing node based at least in part on the processing instructions, and wherein the processing instructions are applied as the key-value pairs are received at the first processing node.

3. The method of claim 1, wherein the processing instructions comprise instructions to read values from key-value pairs assigned to the one of the plurality of channels based on the key, and wherein the key is unique.

4. The method of claim 1, wherein the function is received at a first processing node and, based at least in part on the processing instructions, forwarded to a second processing node at which the processing instructions are applied.

5. The method of claim 1, wherein the processing instructions comprise instructions to write values as key-value pairs to the one of the plurality of channels based on the key.

6. The method of claim 1, wherein the processing instructions comprise instructions to delete values from the one of the plurality of channels based on the key.

7. The method of claim 1, wherein the processing instructions comprise modifications to values within the key-value pairs from a channel based on the key.

8. The method of claim 1, wherein the subset of key-value pairs comprise a historical series of key-value pairs.

9. The method of claim 8, wherein the historical series of key-value pairs comprises a state log for each of the plurality of channels.

10. The method of claim 9, wherein application of the processing instructions to the historical series of key-value pairs restores the channel to a prior state.

11. A messaging system, comprising:
    a memory; and
    one or more computer processors to:
        provide a plurality of channels of a publish-subscribe system, wherein each channel comprises a plurality of messages published to the channel according to an order, wherein the plurality of messages are provided to one or more subscribers of the channel according to the order, wherein each channel is associated with a respective key, wherein at least one key is associated with a respective time-to-live, wherein the at least one key becomes unavailable when the respective time-to-live expires, and wherein each message comprises one or more key-value pairs;
        receive a function comprising a key for identifying one of the plurality of channels and processing instructions to be applied to a subset of the key-value pairs; and apply the processing instructions based at least in part on the key.

12. The messaging system of claim 11, wherein the function is received and stored at a first processing node based at least in part on the processing instructions, and wherein the processing instructions are applied as the key-value pairs are received at the first processing node.

13. The messaging system of claim 11, wherein the processing instructions comprise instructions to read values from key-value pairs assigned to the one of the plurality of channels based on the key, and wherein the key is unique.

14. The messaging system of claim 11, wherein the function is received at a first processing node and, based at least in part on the processing instructions, forwarded to a second processing node at which the processing instructions are applied.

15. The messaging system of claim 11, wherein the processing instructions comprise instructions to write values as key-value pairs to the one of the plurality of channels based on the key.

16. The messaging system of claim 11, wherein the processing instructions comprise instructions to delete values from the one of the plurality of channels based on the key.

17. The messaging system of claim 11, wherein the processing instructions comprise modifications to values within the key-value pairs from a channel based on the key.

18. The messaging system of claim 11, wherein the subset of key-value pairs comprise a historical series of key-value pairs.

19. The messaging system of claim 18, wherein the historical series of key-value pairs comprises a state log for each of the plurality of channels, and wherein application of the processing instructions to the historical series of key-value pairs restores the channel to a prior state.

20. A non-transitory computer-readable medium having instructions stored thereon that when executed by one or more computer processors, cause the one or more computer processors to:

provide a plurality of channels of a publish-subscribe system, wherein each channel comprises a plurality of messages published to the channel according to an order, wherein the plurality of messages are provided to one or more subscribers of the channel according to the order, wherein each channel is associated with a respective key, wherein at least one key is associated with a respective time-to-live, wherein the at least one key becomes unavailable when the respective time-to-live expires, and wherein each message comprises one or more key-value pairs;

receive, by the one or more computer processors, a function comprising a key for identifying one of the plurality of channels and processing instructions to be applied to a subset of the key-value pairs; and apply the processing instructions based at least in part on the key.

\* \* \* \* \*